(12) United States Patent
Helb

(10) Patent No.: US 9,889,732 B2
(45) Date of Patent: Feb. 13, 2018

(54) VEHICLE COVERING STRUCTURE

(71) Applicant: Joseph Fello Helb, Philadelphia, PA (US)

(72) Inventor: Joseph Fello Helb, Philadelphia, PA (US)

(*) Notice: Subject to any disclaimer, the term of this patent is extended or adjusted under 35 U.S.C. 154(b) by 0 days.

(21) Appl. No.: 15/065,032

(22) Filed: Mar. 9, 2016

(65) Prior Publication Data

US 2017/0259661 A1 Sep. 14, 2017

(51) Int. Cl.
*B60J 7/20* (2006.01)
*B60J 11/04* (2006.01)

(52) U.S. Cl.
CPC .................... *B60J 11/04* (2013.01)

(58) Field of Classification Search
CPC ......... B23K 37/04; B60J 10/265; B60J 10/30; B60J 10/70; B60J 7/102; B60P 3/08; G07B 15/063; B62D 1/28; G01S 13/931; G01C 21/28
USPC .................................................. 296/136.11
See application file for complete search history.

(56) References Cited

U.S. PATENT DOCUMENTS

| 4,294,483 | A | * | 10/1981 | Ferris | B60J 11/00 180/84 |
| 4,635,996 | A | * | 1/1987 | Hirose | B60J 11/08 296/136.07 |
| 4,727,898 | A | * | 3/1988 | Guma | B60J 11/02 135/87 |
| 4,795,207 | A | * | 1/1989 | Clarke | B60J 11/00 150/166 |
| 4,842,324 | A | * | 6/1989 | Carden | B60J 11/00 150/166 |
| 4,863,210 | A | * | 9/1989 | Kenon | B60J 11/00 150/166 |
| 4,867,216 | A | * | 9/1989 | McKee | B60J 11/00 150/166 |
| 4,972,892 | A | * | 11/1990 | Yeh | B60J 11/00 150/166 |
| 5,029,933 | A | * | 7/1991 | Gillem | B60J 11/00 150/166 |
| 5,161,849 | A | * | 11/1992 | Holland, Jr. | B60J 11/00 116/28 R |
| 5,167,267 | A | * | 12/1992 | McQuaid | B60J 11/00 150/154 |
| 5,197,503 | A | * | 3/1993 | Chen | B60J 11/00 135/151 |
| 5,429,406 | A | * | 7/1995 | Huang | B60J 11/00 150/166 |
| 5,435,362 | A | * | 7/1995 | Chiang | B60J 11/00 150/166 |

(Continued)

*Primary Examiner* — Kiran B Patel
(74) *Attorney, Agent, or Firm* — Egbert Law Offices, PLLC

(57) ABSTRACT

This invention relates to a vehicle covering structure having a plurality of tarps to cover an outer body of a vehicle frame and a pair of drag bars to provide a sweeping mechanism for clearing the plurality of tarps. Further, the vehicle covering structure comprises a holding means located on a plurality of edges of each tarp to hold the plurality of tarps. The structure being made of a waterproof material selected from a group of tarpaulin, nylon, poly vinyl chloride canvas, polyester canvas and a combination thereof, to protect the outer surface of the vehicle from hail and other falling objects.

5 Claims, 2 Drawing Sheets

(56) References Cited

U.S. PATENT DOCUMENTS

| | | | | |
|---|---|---|---|---|
| 5,456,515 | A * | 10/1995 | Dang | B60J 11/025 150/166 |
| 5,497,819 | A * | 3/1996 | Chiang | B60J 11/00 150/166 |
| 5,664,825 | A * | 9/1997 | Henke | B60J 11/00 150/166 |
| 5,791,361 | A * | 8/1998 | Chong | B60J 11/00 135/119 |
| 5,915,399 | A * | 6/1999 | Yang | B60J 11/00 135/119 |
| 6,076,577 | A * | 6/2000 | Ontaneda | B60J 11/08 150/168 |
| 6,220,648 | B1 * | 4/2001 | Daniel | B60J 11/00 296/136.02 |
| 6,318,393 | B1 * | 11/2001 | Glasgo | B60J 11/00 135/88.05 |
| 6,491,335 | B1 * | 12/2002 | Cohill | B60J 11/00 150/166 |
| 6,517,141 | B1 * | 2/2003 | Su | B60J 11/00 150/166 |
| 6,578,900 | B1 * | 6/2003 | Riportella | B60J 11/08 150/166 |
| 6,705,337 | B1 * | 3/2004 | Peckham | B60J 11/00 135/88.07 |
| 7,025,404 | B1 * | 4/2006 | Gilbert | B60J 7/10 135/913 |
| 7,036,867 | B1 * | 5/2006 | Yang | B60J 11/00 150/166 |
| 7,100,965 | B1 * | 9/2006 | Stover | B60J 11/06 296/136.03 |
| 7,360,820 | B2 * | 4/2008 | Tellez | B60J 11/00 150/166 |
| 7,431,375 | B1 * | 10/2008 | Julius | B60J 11/06 150/168 |
| 8,146,984 | B2 * | 4/2012 | Devereaux | B60J 11/00 150/166 |
| 9,352,642 | B2 * | 5/2016 | Fogarty | B60J 11/04 |
| 9,517,685 | B2 * | 12/2016 | Stelzer | B60J 11/04 |
| 2001/0045758 | A1 * | 11/2001 | Vieira-Soares | B60J 11/00 296/98 |
| 2002/0078987 | A1 * | 6/2002 | Montes | B60J 11/00 135/87 |
| 2007/0085372 | A1 * | 4/2007 | Dhanray | B60J 11/00 296/136.07 |
| 2011/0095561 | A1 * | 4/2011 | Li | B60J 11/04 296/136.13 |
| 2014/0265427 | A1 * | 9/2014 | Featherman | B60J 11/04 296/136.11 |

* cited by examiner

VEHICLE COVERING STRUCTURE

CROSS REFERENCE TO RELATED APPLICATIONS

Not applicable

FEDERALLY SPONSORED RESEARCH AND DEVELOPMENT

Not applicable.

FIELD OF THE INVENTION

The present invention relates to the field of waterproof vehicle cover. The invention, particularly relates to a detachable automobile vehicle cover to protect the vehicle from the abrupt environment condition.

BACKGROUND OF THE INVENTION

Vehicle covers have been used to protect parked or stored vehicles from damage caused by environmental and weather conditions such as solar radiation, heat, pollution, dust, acid rain, sleet, hail, and flying objects which may be encountered during violent or severe weather. Although existing vehicle covers adequately protect against some of those conditions, most are not very effective at quickly removing snow and ice from the exterior of a vehicle. Those covers which do protect against snow are usually configured to also prevent damage to the exterior of the vehicle from hailstones and other hard objects. Those covers which are designed to protect against such hard objects are bulky and cumbersome, making installation and removal an arduous and time consuming process. Moreover, such covers are typically difficult to store due to their bulk.

There have been a number of solutions provided for protecting the vehicle from such type of conditions and few of them have been discussed below:

US 20140167444 A1 pertains to a cover for motor vehicles and other objects that splits into two parts so that it can be removed and thereby remove any snow and/or ice accumulated on the vehicle. The vehicle cover is divided into two separate sections longitudinally; however, the division of the vehicle cover, which forms the shape and size of each individual half of the cover, can be constructed in many variants including but not limited to asymmetrical designs. The two separate sections of the vehicle cover terminate with vertical barriers which attach to each other, via loop-and-hook type fasteners or other articulating mechanisms, at several points along the medial vertical barriers. Once the snow storm is over, each half of the snow cover is removed separately, which allows the snow and ice to drop to the ground revealing a clean vehicle.

US 20070085372 A1 relates to a snow and ice repelling vehicle cover that includes a hood panel configured to cover a hood of a vehicle; a hood panel attachment means coupled to the hood panel and configured to removably attach the hood panel to the vehicle; a windshield panel configured to cover a windshield of a vehicle; a windshield panel attachment means coupled to the windshield panel and configured to removably attach the windshield panel to the vehicle; a roof panel configured to cover a roof of a vehicle; a roof panel attachment means coupled to the roof panel and configured to removably attach the roof panel to the vehicle; and where each panel is configured such that when slid off of the underlying vehicle surface, the underlying vehicle surface is left relatively clear of snow and ice.

U.S. Pat. No. 8,793,917 B2 discloses a snow protection device, which mainly comprises a piece of waterproof cloth, two bars, and at least two rubber magnets. The waterproof cloth comprises a piece of cloth that is light-weighted, wind able, and resistant against penetration of water. The two bars are respectively mounted to opposite side edges of the waterproof cloth. The two rubber magnets are of magnetic attraction and are flexible and are arranged on the waterproof cloth at locations adjacent to and beside the bars. As such, the two bars can be used to collapse and expand the waterproof cloth and the rubber magnets may be securely attached, by means of magnetic attraction, to locations around a windshield so as to securely hold the waterproof cloth in position. The waterproof cloth is thus set to shield and cover the windshield. The resistance against water penetration of the waterproof cloth prevents water from contacting and being frozen on the windshield.

The aforesaid documents and other similar solutions may strive to provide an efficient roll vehicle cover; however, they still have a number of limitations and shortcomings such as, but not limited to, a secure means of attachment to the vehicle, leaving them subject to removal or partial removal by strong winds that very often accompany snow storms. Virtually all of the prior art devices suffer the characteristic that they add significant, complex arrangement of the various modules and further, the system is less economical to the user. The above mentioned prior arts include a cover constructed of canvas or nylon and having a means for securing the cover to the vehicle such as an elastic band extending about its periphery or hooks for attaching to a vehicle. The devices found in the prior art do not provide the convenience, flexibility and economy, which is sought by consumers, and accordingly have been commercially unsuccessful.

The present invention addresses all of the limitations and problems found in the prior art and it fulfills all of the criteria listed in the preceding paragraph. Further, the unique combination, construction, and the particular configuration of the present invention is clearly distinguishable from the prior art.

SUMMARY OF THE INVENTION

In the view of the foregoing disadvantages inherent in the known types of vehicle covers now present in the prior art, the present invention provides an improved vehicle covering structure. As such, the general purpose of the present invention, which will be described subsequently in greater detail, is to provide a new and improved vehicle covering structure with a portable feature like detachable means and a plurality of tarps, which has all the advantages of the prior art and none of the disadvantages.

An object of the invention is to provide a vehicle covering structure, which includes a plurality of tarps to cover an outer body of a vehicle frame, a pair of drag bars to provide a sweeping mechanism for clearing a plurality of tarps and a holding means located on a plurality of edges of each tarp to hold the plurality of tarps.

It is another object of the present invention to provide the vehicle covering structure which reduces the need of cleaning and further, protecting an outer surface of a vehicle from hail and other falling objects.

It is another object of the present invention to provide the vehicle covering structure, which can be assembled and de-assembled multiple pieces of tarp with the help of a holding means. Further, the each tarp can be detached from other pieces of tarps by applying pulling mechanism to the holding means.

It is another object of the present invention to provide the vehicle covering structure, i.e. remove the snow and other falling objects by snatching the drag bars on the pieces and pull to detach them, and as the user drag the pieces apart, the object is dragged off as well.

It is another object of the present invention to provide the covering structure that comes in five sections and/or tarps, which are light-weighted and waterproof. The covering allows easy and complete removal of snow and the like objects, deposited on the vehicle without causing damage to the vehicle.

It is another object of the present invention to provide the covering structure, i.e. simple and cost effective and further, saves the time and energy of the user.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
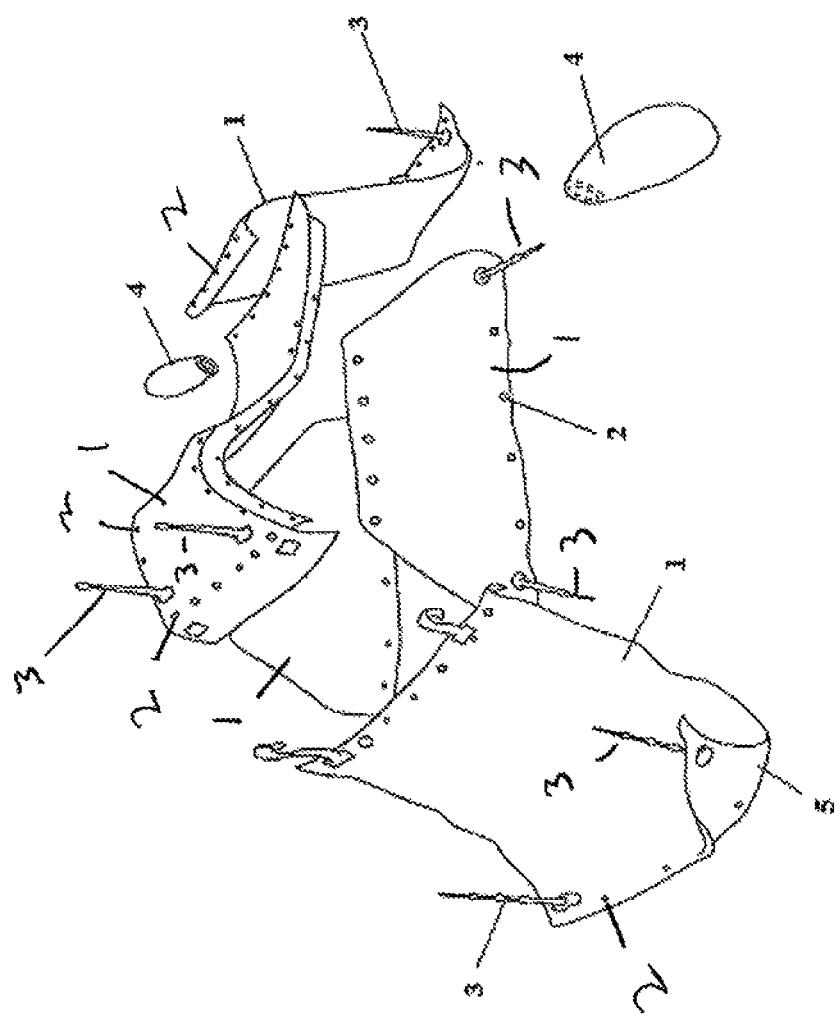
FIG. 1 is a perspective view illustrating a vehicle covering structure of the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention generally provides a vehicle covering structure that comprises of multiple pieces of tarp (1), soft inner waterproof lining (5), drag bars (3), and a holding means (2) such as magnet, snapping button, velcro patch and velcro strap and the like, mirror cover with elastic band (4). The invention is provided with velcro straps that runs from the back piece to the top piece and allows the two pieces to be dragged as one piece. The mirror covers are provided with an elastic tip for ease of going over the mirror.

Referring to FIG. 1, shows a perspective view of the vehicle covering structure with a first preferred embodiment according to the present invention. The holding means (2) enables the user to attach the multiple pieces of tarp (1) into a solitary structure by sticking out on the edges of the tarp with each other. The holding means allows the user to wrap up the covering structure using a pulling mechanism into a small parts while not in use. The drag bars (3) are used to enable the user for immediate snatching and clearing the tarp, this could reduce the user effort in cleaning process. Further, the pair of drag bars is movable in the perpendicular direction on the installed surface of the vehicle.

In accordance with an embodiment of the present invention, the vehicle covering is creating a magnetic pull to assemble and de-assemble the pieces of tarp. When a pulling mechanism is applied by a user, the holding means is movable along the plurality of edges of each tarp. Further, the holding means is selected from, but not limited to, a magnet or a snapping button, although other suitable fastening elements can also be used by the manufacturer as per the requirement.

Figure 2:
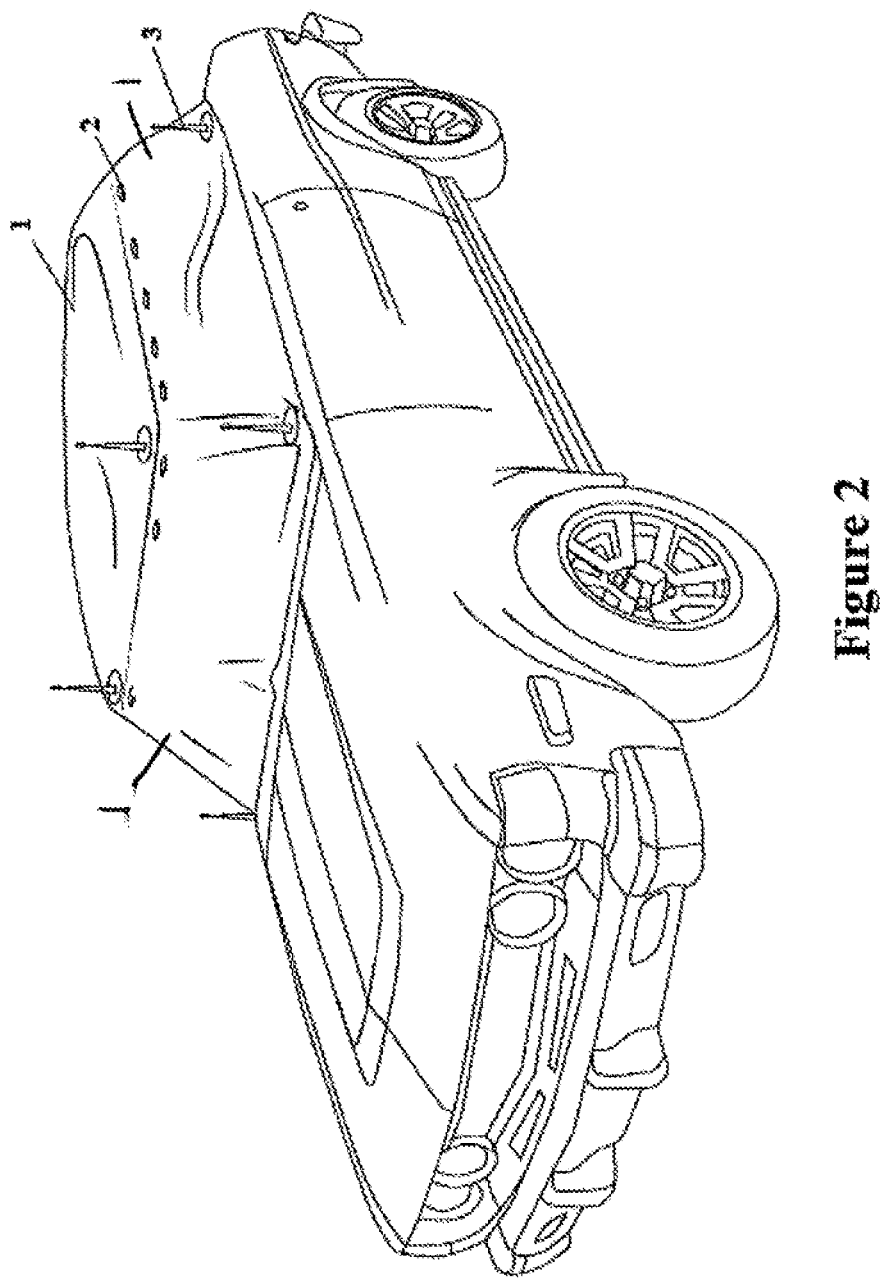
FIG. 2 is another perspective view of the present invention, i.e. anchored on a car body.

As shown in FIG. 2, the covering structure (1), i.e. anchored on a car body, having a pair of drag bars (3) and a magnetic holding means (2) to form a one piece structure. The vehicle covering structure that effectively protects a vehicle from hail and other falling objects and which is easily installed, removed and is compact enough to be stored in the trunk of the vehicle or other desired area. The covering structure has a top region and side panel regions, are integrally formed in either one piece or separate pieces which have been sticking out by a magnet and/or a snapping button. Further, the shape and size of the tarp are not explicitly defined and determined by the manufacturer as per the need and size of the vehicle.

The above-mentioned vehicle covering structure provides a flexible device for protecting the vehicle from the abrupt environment condition. The parts come together to create an easy and fast means of taking snow off the vehicle. The drag bars stick out so the user can immediately grab and drag the tarp, the magnets allows the pieces to easily and immediately come apart, the tarp like surface keeps the snow off the surfaces, and the cloth underside allows for smooth dragging. In addition, the magnetic holding means is providing a detachable tarp that makes the covering structure more flexible and portable with easy installation. Also, the size and dimension of whole components of the system can be manufactured as per the requirement of the user.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

I claim:

1. A structure for covering a vehicle having a frame, the structure comprising:
   a plurality of tarp pieces releasably connected to each other, said plurality of tarp pieces adapted to cover the frame of the vehicle, each of said plurality of tarp pieces comprising:
      a four-sided panel having holding means positioned along a perimeter thereof, said holding means for holding one of said plurality of tarp pieces relative to another of said plurality of tarp pieces, said another of said plurality of tarp pieces being adjacent to said one of said plurality of tarp pieces; and
      a pair of drag bars connected to the tarp piece, said pair of drag bars extending outwardly of a surface of the tarp piece.

2. The structure of claim 1, each drag bar of said pair of drag bars being positioned at a corner of the tarp piece.

3. The structure of claim 1, wherein said holding means is a magnet.

4. The structure of claim 1, wherein said holding means is a snapping button.

5. The structure of claim 1, wherein said plurality of tarp pieces are made of a waterproof material selected from a group consisting of: tarpaulin, nylon, polyvinyl chloride, canvas, polyester canvas and a combination thereof.

* * * * *